Aug. 30, 1932.   W. H. NOELTING ET AL   1,875,113
ADJUSTABLE ADAPTER FRAME FOR CASTERS
Filed May 13, 1929
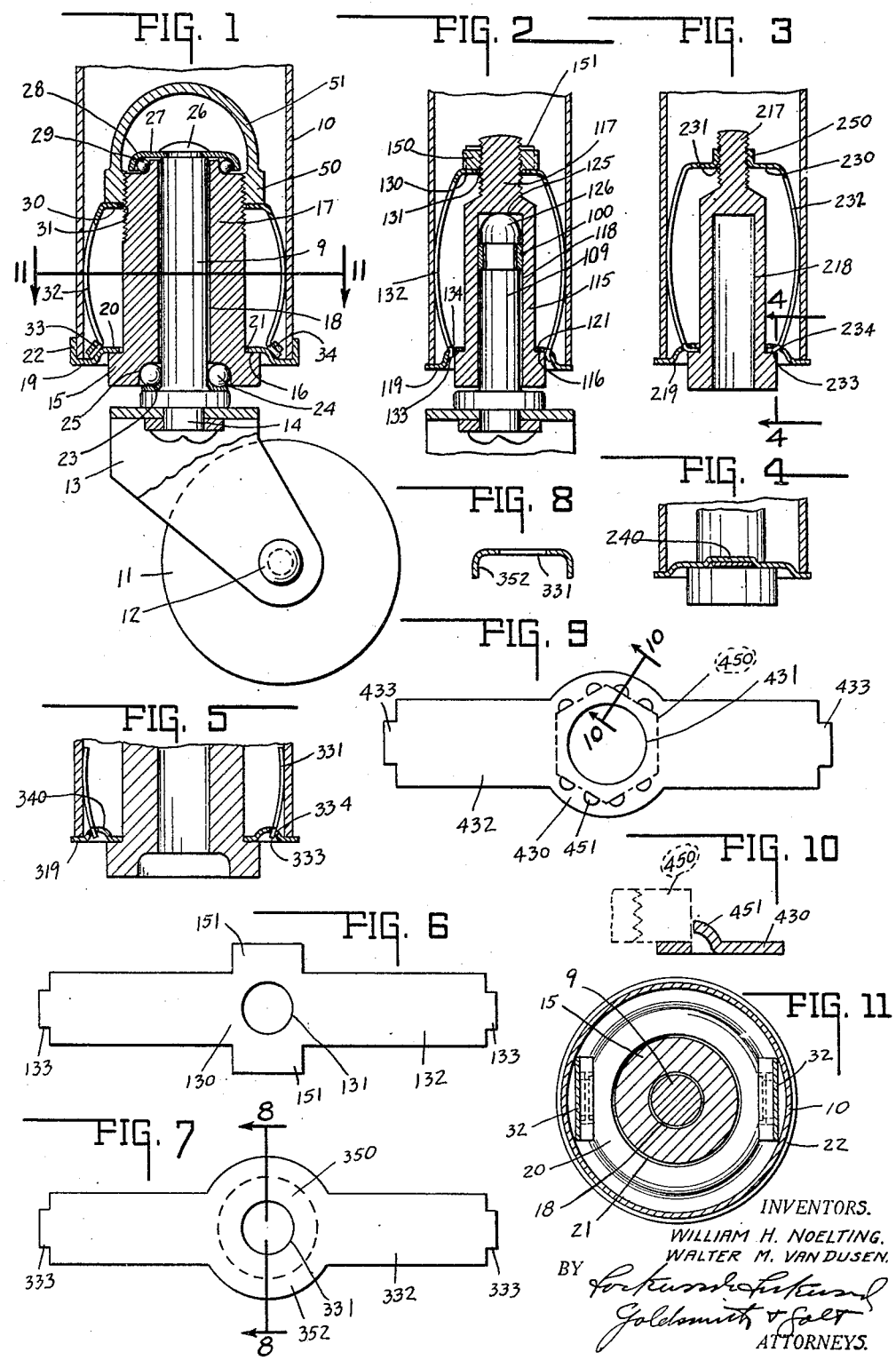

Patented Aug. 30, 1932

1,875,113

UNITED STATES PATENT OFFICE

WILLIAM H. NOELTING AND WALTER M. VAN DUSEN, OF EVANSVILLE, INDIANA, ASSIGNORS TO FAULTLESS CASTER COMPANY, OF EVANSVILLE, INDIANA, A CORPORATION

ADJUSTABLE ADAPTER FRAME FOR CASTERS

Application filed May 13, 1929. Serial No. 362,498.

This invention relates to a caster construction and particularly the mounting therefor.

The chief object of the invention is to mount a caster upon the tubular leg and rigidly retain the same by an adjustable frame.

The chief feature of the invention consists in the yielding mounting of a caster, which mounting includes a spring frame, a leg-supporting member, a stem-receiving socket associated therewith, and a spring tension adjusting member associated with said socket, and bearing on said spring frame for obtaining a predetermined tension.

This invention is an improvement upon that shown in the application of Clarence B. Noelting and Wm. H. Noelting, Serial No. 271,447, filed April 20, 1928. The subject matter common to both applications is claimed in the earlier application.

The full nature of the invention will be more clearly understood from the accompanying drawing and the following descriptions and claims:

Fig. 1 is a central sectional view of the invention, including a caster and mounted upon a leg. Fig. 2 is a central sectional view on a smaller scale, and of a modified form of the invention. Fig. 3 is a similar view of a slightly different form of the invention. Fig. 4 is a sectional view taken on line 4—4 of Fig. 3 and in the direction of the arrows. Fig. 5 is a central sectional view of a modified form of spring frame and leg-supporting plate connection. Fig. 6 is a plan view of one form of spring frame blank. Fig. 7 is a similar view of a modified form of blank. Fig. 8 is a transverse sectional view taken on the line 8—8 of Fig. 7 and in the direction of the arrows and subsequent to deformation. Fig. 9 is a view similar to Figs. 6 and 7 and of a modified form of the invention. Fig. 10 is a sectional view taken on the line 10—10 of Fig. 9 and in the direction of the arrows. Fig. 11 is a transverse sectional view of the invention shown in Fig. 1 and is taken on the line 11—11 thereof and in the direction of the arrows.

In the drawing 10 indicates a tubular leg, 11 a caster wheel pivotally supported at 12 by a caster yoke 13 supported by a stem 14 of any preferred construction. The stem 14 is receivable by a steel member 15 having a shelf, flange or drum 16 at its lower end and an exteriorly threaded upper end 17. The tubular socket 15 includes a substantially cylindrical opening 18 for receiving the cylindrical portion 9 of the stem and rotatably supports the same.

The tube is supported by the caster plate 19 which includes a collar-engaging portion 20, the latter being apertured as at 21 to receive the socket member. As shown in Fig. 1, the plate 19 has an upturned peripheral flange 22, while the forms of the invention shown in Figs. 2, 3, 4 and 5 do not include this leg mount, altho the same may be provided if desired.

Several different types of anchorages for the stem may be provided. Fig. 1 illustrates a stem supporting an annular bearing washer of hardened metal and indicated by the numeral 23. A series of balls 24 rests thereon and laterally engages the stem and also engages an annular case hardened groove 25 concentric with the cylindrical bore 18 formed in the socket member. In Fig. 1, the caster stem extends upwardly and projects beyond the socket member and terminates in the headed portion 26 which contains a ball race retaining plate 27 having the downwardly turned annular flange or ball retainer 28 which retains balls 29 in antifriction relation adjacent the head of the socket member.

Other types of similar mountings are shown in the Clarence B. and William H. Noelting application, Serial No. 271,447, filed Apr. 20, 1928, entitled "Ball bearing caster".

Another type of mounting consists in a stem 109 having a head 126 which bears against the top 125 of the bore 118 in the socket member 115, and the stem in this type of construction is detachably associated with the socket member, while, in the type of construction shown in Fig. 1, the stem and socket member are permanently connected together. The stem is retained in the socket in the form of the invention shown in Figs. 2 and 3 by an annular split resilient band 100.

The invention consists in a spring frame construction substantially U-shaped and inverted and having its free ends suitably anchored to the leg-supporting plate and its mid-portion positionable in predetermined spaced relation relative to said plate by an adjustment in the form of a nut or the equivalent associated with the threaded stem portion of the socket member.

In Fig. 1, the U-shaped spring member includes the central portion 30 apertured at 31 and from which extend the depending longitudinally-bowed spring arms 32, the free ends 33 of which are receivable by sockets 34 formed upon or struck from the plate 19.

In Fig. 2, plate 119 is apertured as at 134, and the longitudinally-bowed arms 132 of the U-shaped spring frame, having the central portion 130 centrally apertured as at 131, have their free ends 133 receivable by the slots 134 formed in the plate 119.

In Fig. 3, the spring frame includes the central portion 230 and the longitudinally-bowed arms 232, the free ends 233 being receivable by slots 234 formed in plate 219, which plate has an offset portion 240 as shown clearly in Fig. 4. Said figures also illustrate, as well as Figs. 1 and 2, to a lesser degree, the reduction in width of the free ends 33 of the arms 31 and the other frames with parts are similarly numbered and increased by 100 and 200.

In Fig. 5, the footing or anchorage of the spring frame having the arms 331 is substantially similar, but, in this form of the invention, the plate 319 is provided with an annular ridge 340 which is positionable within the tubular leg and serves to center the plate relative to the leg. The annular ridge 340 is apertured as at 334 and the reduced ends 333 of the inverted U-shaped frame are receivable by the same.

Any one of the foregoing or any other similar type of footing or arm anchorage may be employed in connection with the broader features of the invention.

The means for obtaining predetermined tension and bowing of the spring frame construction includes a nut 50 or an equivalent. In the form of the invention shown in Fig. 1, the nut 50 includes an extension or covering 51, which constitutes a receptacle for lubricant for the anti-friction members and the stem if desired. It is apparent that the threading of the nut so that it approaches the collar or flange 16, causes the spring arms to bow longitudinally and outwardly and thus have a greater over-all width than previously.

In this way, each caster can be adjusted to any size tube within the limits of the lateral displacement of the spring frame arms and be relatively rigidly attached thereto and centered therein. The simplest type of adjustment, therefore, consists of a plain nut.

In Fig. 2, the nut 150 is mounted upon the threaded stem 117, but, while co-axial with the stem-receiving bore 118, it is not concentric therewith, but is superposed relative thereto. In this form of the invention, the spring frame includes an upwardly-extending flange 151 and each side of the nut and the spring frame flange thus has an interlocking engagement which prevents independent rotation.

In Fig. 3, the central portion 230 of the U-shaped spring frame includes an upwardly-extending collar 250 and the central aperture 231 thereof is interiorly threaded to receive the stem 217 arranged similar to stem 117 shown in Fig. 2. It will be evident that, in this form of the invention, the nut and frame are integral.

In Fig. 6, the frame is shown as a cross and the same as that shown in Fig. 2. In this form, the arms 151 cooperate with the nut. The frame is suitably bent and bowed as shown in Fig. 2.

In Figs. 7 and 8, a modified form of the invention is illustrated and in this form, the central portion 350 consists in drawing the sides with the opening for receiving the threaded stem. In other words, the U-shaped frame is substantially that shown in Fig. 1.

A further modified form of the construction is illustrated in Figs. 9 and 10 wherein the central portion 430 of the spring frame construction having arms 432 and reduced free ends 433 is suitably formed as at 451 by offsets which are adapted to engage a nut 450. The collar or flange portion 15, 115 or 215 peripherally may be formed square or hexagonal for tool engagement and turning of said socket caster in the forms of the invention shown in Figs. 2, 3, 9 or 10 to change the spring tension since the nut is held relatively rigid with respect to the spring frame.

The invention claimed is:

1. An adjustable caster for tubular legs, comprising a tubular socket, a plurality of spring frame arms arranged longitudinally thereof, an intermediate centrally apertured portion connecting said arms together at one end, a leg-supporting plate supported by one end of said socket, said socket having a threaded opposite end, and nut means associated with said threaded end and arranged to adjust the bowing of said arms, the opposite ends of said arms being rigidly mounted adjacent the base of said socket and the plate, said nut and the intermediate connection portion having a relatively rigid connection.

2. An adjustable caster for tubular legs comprising a stem receiving socket having a threaded end portion, a tubular stem receiving interior, and a plate supporting flange at the opposite end, a leg supporting plate bearing on said flange, a spring frame having its lower end operatively connected with the flange for preventing axial movement of the lower end of the frame in the direction of the plate, and threaded nut means associated with the threaded end of said socket and the upper end of the frame for initially bowing the intermediate portion of the spring frame.

3. An adjustable caster for a tubular leg comprising a stem receiving socket including an exteriorly threaded end portion, an inner tubular stem receiving portion, and a laterally directed exterior flange, said flange being oppositely positioned from the threaded portion, a caster stem rotatably supported in said tubular stem receiving portion and projecting beyond the socket, laterally enlarged means associated with said projecting end and with said stem for preventing axial separation of said stem from said socket, a load sustaining plate supported by said flange, a spring frame having its lower end operatively connected with the flange for preventing axial movement of the lower end of the frame in the direction of the plate, and threaded nut means associated with the threaded end portion of said socket and the upper end of the frame for initially bowing the intermediate portion of the spring frame.

4. An adjustable caster for tubular legs comprising a stem receiving socket having a threaded end portion, a tubular stem receiving interior and a plate supporting flange at the opposite end, a leg supporting plate bearing on said flange, a spring frame having its lower end operatively connected with the flange for preventing axial movement of the lower end of the frame in the direction of the plate, the lower end of the spring frame and the flange including an interlocking connection the lower end of the spring frame extending through the plate and being interposed between said plate and flange, and threaded means associated with the threaded end of said socket and the upper end of the frame for initially bowing the intermediate portion of the spring frame.

5. An adjustable caster for a tubular leg, comprising a stem receiving socket including an exteriorly threaded end portion, an inner tubular stem receiving portion and a laterally directed exterior flange, said flange being oppositely positioned from the threaded portion, a caster stem rotatably supported in said tubular stem receiving portion and projecting beyond the socket, laterally enlarged means associated with said projecting end of said stem for preventing axial separation of said stem from said socket, a load sustaining plate supported by said flange, a spring frame having its lower end operatively associated with the flange for preventing axial movement of the lower end of the frame in the direction of the plate, and threaded nut means associated with the threaded end portion of said socket and the upper end of the frame for initially bowing the intermediate portion of the spring frame, said threaded nut means being of the cap type and including a chamber portion for receiving and enclosing the upper anchored end of the stem.

6. In combination a caster socket comprising a tubular member threaded at its upper end, a nut threaded thereon, said member including a laterally projecting portion at its open end, a member rotatable thereon and bearing on the portion, and yielding means extending from the nut to the second mentioned member and bearing thereon at one end and expansible outwardly by threading relative movement of the nut toward the portion, and a caster stem mounted in said member and having free rotational movement relative thereto without affecting said yielding means.

7. In combination, a caster socket comprising a tubular member closed at its upper end and threaded, a nut threaded thereon, said member including a laterally projecting portion and a bearing on the portion, and yielding means extending from the nut to the bearing portion and bearing thereon at one end and expansible outwardly by threading relative movement of the nut toward the portion, and a top bearing caster stem detachably mounted in said tubular member and bearing on the closed upper end thereof and having free rotational movement therein without affecting said yielding means.

In witness whereof, we have hereunto affixed our signatures.

WILLIAM H. NOELTING.
WALTER M. VAN DUSEN.